(12) United States Patent
Kawasaki

(10) Patent No.: US 9,662,819 B2
(45) Date of Patent: May 30, 2017

(54) INJECTION DEVICE IN MOLDING MACHINE

(71) Applicant: CENTURY INNOVATION CORPORATION, Tokyo (JP)

(72) Inventor: Hiroaki Kawasaki, Chiba (JP)

(73) Assignee: CENTURY INNOVATION CORPORATION, Tokyo (JP)

( * ) Notice: Subject to any disclaimer, the term of this patent is extended or adjusted under 35 U.S.C. 154(b) by 0 days.

(21) Appl. No.: 14/891,720

(22) PCT Filed: May 16, 2014

(86) PCT No.: PCT/JP2014/063050
§ 371 (c)(1),
(2) Date: Nov. 17, 2015

(87) PCT Pub. No.: WO2014/185514
PCT Pub. Date: Nov. 20, 2014

(65) Prior Publication Data
US 2016/0114509 A1  Apr. 28, 2016

(30) Foreign Application Priority Data

May 17, 2013 (JP) ................. 2013-105120

(51) Int. Cl.
*B29C 45/53* (2006.01)
*B29C 45/58* (2006.01)
(Continued)

(52) U.S. Cl.
CPC ............ *B29C 45/586* (2013.01); *B29C 45/46* (2013.01); *B29C 45/53* (2013.01); *B29C 45/74* (2013.01)

(58) Field of Classification Search
CPC ............................ B29C 45/586; B29C 45/53
See application file for complete search history.

(56) References Cited

U.S. PATENT DOCUMENTS 8,591,218 B2   11/2013  Kawasaki
2013/0071510 A1*  3/2013  Kawasaki ............... B29C 45/53
                                                                425/551

(Continued)

FOREIGN PATENT DOCUMENTS

JP            36-9884 A2    7/1961
JP            6-246802 A    9/1994

(Continued)

OTHER PUBLICATIONS

International Search Report issued in Application No. PCT/JP2014/063050, mailed on Aug. 19, 2014 and translation thereof (5 pages).

(Continued)

*Primary Examiner* — Ryan Ochylski
(74) *Attorney, Agent, or Firm* — Greenblum & Bernstein, P.L.C.

(57) ABSTRACT

An injection device in a molding machine includes: a cylinder having an outlet member formed at a tip-end injection side, a stopper part provided at a rear side, and a pellet supply opening for supplying plastic pellets; a melting device having a plurality of melting holes formed communicating from inflow-side large openings to outflow-side small openings in the longitudinal direction of a device main body, the melting device having a diameter equal to an inner diameter of the cylinder; a heating unit for heating the melting device; and a drive unit for causing the melting device to move in a reciprocating manner.

11 Claims, 12 Drawing Sheets

(51) Int. Cl.
B29C 45/46 (2006.01)
B29C 45/74 (2006.01)

(56) References Cited

U.S. PATENT DOCUMENTS

| | | | | |
|---|---|---|---|---|
| 2016/0089832 A1* | 3/2016 | Kawasaki | ......... | B29C 45/14467 264/263 |
| 2016/0114509 A1* | 4/2016 | Kawasaki | ............... | B29C 45/46 425/550 |
| 2016/0158981 A1* | 6/2016 | Fitzpatrick | .............. | B29C 45/60 264/328.16 |

FOREIGN PATENT DOCUMENTS

| JP | 2000-61977 A | 2/2000 |
|---|---|---|
| JP | 2008-284759 A | 11/2008 |
| JP | 2009-113360 A | 5/2009 |
| JP | 4880085 B1 | 2/2012 |
| JP | 5209142 B1 | 3/2013 |

OTHER PUBLICATIONS

Extended European Search Report in EPO App. No. 14797492, dated Dec. 23, 2016.

\* cited by examiner

RETURN STEP
(MELTING STEP)

OUTWARD STEP
(INJECTION STEP)

INJECTION DEVICE IN MOLDING MACHINE

TECHNICAL FIELD

The present invention relates to an injection device in a molding machine with which a melting step of melting resin of a large number of plastic pellets as changed by moving a melting device in a heated state in a reciprocating manner and an injection step of injecting the melted resin are separated thereby to provide enough time dedicated to melting of the resin and finish the injection step of the melted resin extremely speedy and for a short time.

BACKGROUND ART

Generally, there are screw-type and plunger-type injection devices. As representative examples, a screw-type injection device is disclosed in the patent literature 1 and a plunger-type injection device is disclosed in the patent literature 2. As disclosed in these literatures, the injection device is mainly formed of a cylinder and a screw. Pellets are inserted from a hopper provided in the cylinder and are conveyed to the injection nozzle side by rotation of the screw inside the cylinder, while they are heated and melted. Then, the melted resin is gathered at the tip end of the nozzle and injected so that the melted resin is conveyed to a die.

Generally, plastic pellets (hereinafter referred simply as "pellets") are made from plastic (synthetic resin), and the heat conductivity is from 0.07 to 0.20 kcal/m·hr·° C. This is from one several hundredth to one several thousandth of the heat conductivity of metal. In view of this, the pellets are approximately heat insulating material. Accordingly, even if the pellets are given a sufficient amount of melting heat to be melted, the heat is hard to reach the inside of the pellets (centers of the pellets), and it takes much time to heat the pellets completely.

Therefore, it is difficult to shorten the time from when each pellet is melted sufficiently and to when resin molding is produced. The pellets need to be melted for a relatively long time in the cylinder and the working efficiency is not good. Besides, in the injection device, each solid of the many inserted pellets in the cylinder is heated and moved to the injection side by rotation of the screw, and at this time, a part of many pellets is pressed against the inner wall of the cylinder.

In other words, the pellets are pressed by the inner wall of the cylinder. Then, the surface of the solid of each pressed pellet is partially in contact with the inner wall of the cylinder and melting of each pellet is restricted to a part of the pellet solid in contact with the cylinder. The pellets kneaded in the cylinder by the screw are moved away from the inner wall of the cylinder for a short time and therefore, the pellets are not heated sufficiently and pellet solids are not melted as a whole, resulting in mixture of melted parts and non-melted parts of the pellets.

As the pellets are pressed against the inner wall of the cylinder by screw in a repeated manner, the pellets are completely melted, and when melted pellets are conveyed toward the nozzle, the amount of resin pooled in the cylinder is equal to or more than several tens of times of the amount that is needed for one injection so that an unnecessary amount of pellets remains in the cylinder.

Besides, when the melted resin passes through a gap between the screw and the cylinder, the resin suffers mechanical damage. Particularly, such a problem is often caused when melting pellets with glass fibers and the screw may be worn. Further, as each pellet is partially melted at random, it is inevitable that the like pellets may remain everlastingly in the cylinder. Accordingly, the operation may become particularly difficult when changing pellet materials in the cylinder.

As a substitute as such a screw type, there is a plunger-type injection device. Such a plunger type is simple in structure and is likely to be downsized. For the plunger type, it does not have the defect that the screw may be worn. The patent literature 2 discloses the plunger type injection device having the most basic structure, which is configured to have a head-cut conical shaped heating cylinder having a plurality of through holes, an injection plunger, a supply tube and so on. The injection plunger is used to convey a synthetic resin material to the heating cylinder to be injected. However, the injection device of the patent literature 2 also has various problems.

In the patent literature 2, the injection plunger and the head-cut conical shaped heating cylinder are formed to have different diameters at their facing surfaces, and the diameter of the injection plunger is formed one size smaller than the diameter of the heating cylinder at the facing portion. In addition, there is formed an air space surrounded by the tip end of the injection plunger, the heating cylinder, a tip end part of the injection plunger and a supply tube, and this air space is a larger area than the area at the tip end of the injection plunger.

Accordingly, the melted synthetic resin material is once pushed into the air space by the injection plunger, but even when the injection plunger further moves toward the heating cylinder, the synthetic resin material is not able to flow into the through holes of the heating cylinder efficiently and some material may remain in the air space without flowing into the heating cylinder. Then, the residual synthetic resin material in the air space may become an obstacle to a synthetic resin material that is to be newly supplied into the through holes of the heating cylinder. And, there may arise a problem of mixture of the synthetic resin material to be newly supplied and residual resin remaining for a long time to be deteriorated.

Then, the applicant of the present application has developed an injection device in a molding machine which is capable of eliminating the inconveniences of the injection plunger and the head-cut conical shaped heating cylinder and performing the pellet resin melting step and the melted resin injection step extremely efficiently, as disclosed in the patent literature 3. According to this patent literature 3, there has been provided an epoch-making invention that only by pressing a lump of pellets by the plunger, it is possible to melt the pellets into melted resin and inject the melted resin simultaneously.

According to this invention, in the melting step of melting pellets, the pellets pass through a plurality of cone-shaped holes of a heated melting device with a predetermined pressure and when the pellets go out of the outlet, the solid pellets become melted resin. That is, the melting speed and the injection speed are set to be the same in consideration of the quality of pellet material, viscosity of melted resin, melting temperature, pressure, melting speed, injection speed, flow rate and so on. With this invention, melting is very accelerated in terms of the melting speed, but then, in terms of the injection speed, injection takes the same time as the melting and the injection is felt slow.

CITATION LIST

Non-Patent Literature

Patent Literature 1: Japanese Patent Application Publication No. 6(1994)-246802

Patent Literature 2: Japanese Patent Publication No. 36(1961)-9884

Patent Literature 3: Japanese Patent No. 4880085

SUMMARY OF INVENTION

Technical Problem

Then, the problem to be solved by the invention (purpose of the present invention) is to separate a melting step of melting resin by passing through a plurality of cone-shaped holes or like holes of a heated melting device with a predetermined pressure and an injection step of the melted resin following the melting step thereby to speed up the injection step. That is, the melting step and the injection step are performed in a repeated manner regardless of their time durations thereby to be able to speed up the injection step dramatically.

Solution to Problem

In order to solve the above-mentioned problem, the present inventor have pursued studies diligently and reached the present invention. That is, an aspect of the present invention is an injection device in a molding machine comprising: a cylinder having an outlet member formed at a tip-end injection side in a longitudinal direction, a stopper part provided at a rear side, and a pellet supply opening provided in an intermediate position between the stopper part and the outlet member for supplying plastic pellets; a melting device having a plurality of melting holes formed communicating from inflow-side large openings to outflow-side small openings in the longitudinal direction of a device main body, the melting device having a diameter equal to an inner diameter of the cylinder; a heating unit for heating the melting device; and a drive unit for causing the melting device to move in a reciprocating manner, wherein the outflow-side small openings of the melting device face the outlet member, the melting device operates as a plunger in the cylinder and a return travel of the drive unit is configured to correspond to a melting step of melting the plastic pellets and an outward travel of the drive unit is configured to correspond to an injection step of melted resin, in the cylinder, an opening and closing valve is provided between the outlet member and the melting device, the opening and closing valve is configured to open the outflow-side small openings of the melting device in the return travel step of the melting device and to close the outflow-side small openings of the melting device in the outward travel step of the melting device.

A second aspect of the present invention is characterized in that, in the injection device in a molding machine according to the first aspect, the opening and closing valve is shaped like a circular plate having a diameter smaller than the diameter of the melting device, the opening and closing valve is always elastically pressed toward the melting device, and in the injection step of the melted resin as outward travel of the melting device, the opening and closing valve closes the outflow-side small openings of the melting device.

A third aspect of the present invention is characterized in that, in the injection device in a molding machine according to the first aspect, the opening and closing valve is shaped like a circular plate and has a plurality of through holes formed as displaced from the outflow-side small openings, the opening and closing valve is always elastically pressed toward the melting device, and in the injection step of the melted resin as outward travel of the melting device, the opening and closing valve closes the outflow-side small openings of the melting device.

A fourth aspect of the present invention is characterized in that, in the injection device in a molding machine according to the first or second aspect, the melting holes of the melting device are each formed in a cone shape narrowing from the inflow-side large openings to the outflow-side small openings. A fifth aspect of the present invention is characterized in that, in the injection device in a molding machine according to the first or second aspect, the melting holes of the melting device are each formed such that a large-diameter cylindrical part as an inflow-side large opening is formed up to a point close to an end and an outflow-side small opening is formed only at an outflow end.

A sixth aspect of the present invention is characterized in that, in the injection device in a molding machine according to the first or second aspect, inflow-side large openings of any adjacent two of the melting holes each have a circular cross section and an inlet part of each of the inflow-side large openings is chamfered to be a plate-shaped chamfered part and boundary parts of plate-shaped chamfered parts of adjacent inflow-side large openings are formed like edge.

A seventh aspect of the present invention is characterized in that, in the injection device in a molding machine according to the first or second aspect, a shutter mechanism for opening or closing the pellet supply opening is provided at the pellet supply opening. An eighth aspect of the present invention is characterized in that, in the injection device in a molding machine according to the first or second aspect, when the melting device and a reciprocating motion bar of the drive unit are grouped into one set, a plurality of sets are provided and are arranged in parallel with each other.

A ninth aspect of the present invention is characterized in that, in the injection device in a molding machine according to the eighth aspect, two sets of the melting device and the reciprocating motion bar are arranged in parallel with each other. A tenth aspect of the present invention is characterized in that, in the injection device in a molding machine according to the eighth aspect, three or more sets of the melting device and the reciprocating motion bar are arranged in parallel with each other.

Advantageous Effects of Invention

According to the present invention, as the melting device in a heated state is made to move in a reciprocating manner, the melting step of melting many inserted pellets and the injection step of melted resin are separated, thereby bringing about advantageous effects of being able to save sufficient time to melt the pellets and to complete the injection step of melted resin quite speedily and for a short time and efficiently. Particularly, according to the present invention, as the melting device main body acts as a plunger, there is brought about an advantageous effect of being able to realize the melting step and the injection step by the reciprocating movement of the melting device without using a separate-member plunger, which Applicant needed conventionally.

Particularly, in an experimental example, when the melting device is operated in the return step with many pellets stacked in the cylinder, the pellets filled up in the cylinder do not flow back, but are pressed by each other to pass through a plurality of melting holes communicating from inflow-side large openings to outflow-side small openings. With this process, the pellets are melted to be melted resin effectively.

Specifically, the side surface of each outflow-side small opening of the melting device serves as a pressing surface of the plunger and melted resin pooled in the cylinder at the side surface of each outflow-side small opening of the melting device is advantageously able to be injected to the outside via the nozzle part by one pressure, quickly and promptly. That is, as the resin melting step of many plastic pellets and the injection step of the melted resin are separated, it is possible to assure sufficient time to melt the resin in a good manner and also as the melted resin is liquefied, it is possible to allow the injection operation at the maximum speed, for a short time and efficiently.

The pressed multiple pellets are able to be conveyed directly and with almost no wastes, to a plurality of inflow-side large openings of the melting holes of the melting device. Accordingly, multiple pellets between the stopper part and the inflow-side surface part of the melting device are able to be conveyed continuously. The pellets pressed between the stopper part and the inflow-side surface part of the melting device and inserted via the inflow-side large openings of the melting holes are surrounded by the inner circumferential wall surfaces of the melting holes. Since the melting holes are each formed like a cone-shaped or approximately cone-shaped channel, the pressing force becomes larger as the pellets move toward the outflow-side small openings, and the pellets are heated and melted to be small.

The melting device itself is heated at the melting temperature of the pellets by the heating unit so that pellets become melted. At this time, the whole circumference of each pellet is surrounded by the inner circumferential wall surface of the melting hole and the pellet is able to be melted in balance and approximately evenly from the outer circumferential part to the center. Besides, in the process where each pellet moves from the inflow-side large opening to the outflow-side small opening, as the device main body has large heat capacity, once the device main body is heated to the high temperature, the melting device heats the pellets and keeps the sufficient melting temperature irrespective of the temperatures of melted pellets.

Then, each pellet is melted approximately evenly from the outer circumference to the center, pressed by following pellets that are continuously inserted via the inflow-side large opening and thereby, is able to move toward the outflow-side small opening of the melting hole. During this movement, the pellet continues to be melted, when the pellet passes through the approximately middle portion of the melting hole in the axial direction (longitudinal direction), the pellet is almost melted, and also with the melting heat of the melting device, surrounding pellets continue to be melted in an accelerated manner. Near the outflow-side small openings, the pellets are completely melted at the highest temperature and are polled in the cylinder as melted resin.

Thus, according to the present invention, the melting device has melting holes each with a narrowed tip end in the device main body. As the multiple pellets pressed from the pellet storage area of the cylinder are inserted into the inflow-side large openings at the large opening side of the many melting holes with narrowed tip ends heated at the melting temperature by the heating unit, the pellets are melted in balance and as the melting device has large heat capacity, it is able to be kept at the high temperature. With this structure, the melting is accelerated with higher melting speed and the melted resin is pooled at the outlet member side.

Particularly, in the melting device, the temperature of resin is maximized at the outflow-side small openings by the heating unit. As the temperature of resin is optimized and maximized just before injection, it is possible to minimize the time duration where the resin is in the high-temperature state and also possible to prevent the resin from being deteriorated, thereby resulting in molding of high quality. That is, the melting device is configured to be able to increase the temperature of the resin to be optimal in the last stage of resin melting and just before injection.

Further, the melting device has, in the device main body, a plurality of melting holes each formed like a cone-shaped channel or approximately cone-shaped channel, and these melting holes are able to be arranged approximately in parallel with each other without being focused from the inflow-side surface part toward the outflow-side surface part. With this structure, the plural outflow-side small openings are able to be arranged not densely but evenly. Therefore, the heat capacity of the melting device itself is sufficiently increased, the volume of the thick parts (solid parts) between the melting holes to the outflow-side surface part side is increased sufficiently, and the heat capacity between the melting holes is also increased.

Accordingly, in the process where the pellets move in the melting holes from the inflow-side large openings toward the outflow-side small openings, the melting device is once heated to the high temperature by the heating unit and the high temperature is kept by the large heat capacity. Then, the melted pellets are also kept at sufficiently high melting temperatures without being decreased in temperature, thereby resulting in production of melted resin from pellets of excellent quality.

Further, according to the present invention, as the opening and closing valve is provided, it is possible to produce melted resin in an excellent manner in the melting step and also possible to, in the injection step, inject the melted resin smoothly while preventing the resin from flowing backward in the melting device.

In the second and third aspects, there is produced the same effect as the present invention. In the fourth aspect, there is an advantage that melting can be performed in a good manner as each melting hole is formed in a cone shape from the inflow-side large opening to the outflow-side small opening.

In the fifth aspect, the melting holes are each formed such that a large-diameter cylindrical part as an inflow-side large opening is formed up to a point close to an end and an outflow-side small opening is formed only at an outflow end. With this structure, it is possible to form the cylindrical part up to the point close to the end to have the diameter, thereby enabling manufacturing of the melting device much more inexpensively than manufacturing of the melting device with cone-shaped melting holes. With thus formed melting holes, the pellets are pressed and heated by a heating force at the back side, which brings about the same effect as the cone-shaped melting holes.

In the sixth aspect, inflow-side large openings of any adjacent two of the melting holes each have a circular cross section and an inlet part of each of the inflow-side large openings is chamfered to be a plate-shaped chamfered part and boundary parts of plate-shaped chamfered parts of adjacent inflow-side large openings are formed like edge. With this structure, the pellets are broken and separated into fines pieces by the edge-shaped boundary parts of the plate-shaped chamfered parts of adjacent inflow-side large openings, which makes it possible to cause the pellets to move into the inflow-side large openings more easily and also possible to accelerate melting of the pellets.

In the seventh aspect, the amount of pellets supplied from the hopper is able to be controlled and a desired amount of pellets is able to be subjected to melting and injection, which makes it possible to perform the operation in an orderly manner.

In the eighth aspect, a melting device and a reciprocating motion bar are paired into one set and there are provided a plurality of such sets. With this structure, it is preferably used for a large-sized die that needs a large amount of pellets, and it is also extremely preferable when a die is used in the outlet member from the injection device in the present invention to form a long work (product) directly.

In the ninth aspect, regarding the set of a melting device and a reciprocating motion bar as defined in the eighth aspect, there are two such sets arranged in parallel with each other. With this structure, it is possible to support a large-sized die though the injection device is relatively small.

In the tenth aspect, regarding the set of a melting device and a reciprocating motion bar as defined in the eighth aspect, there are three or more such sets arranged in parallel with each other. With this structure, it is possible to support a more large-sized die though.

DESCRIPTION OF EMBODIMENTS

Figure 1A:
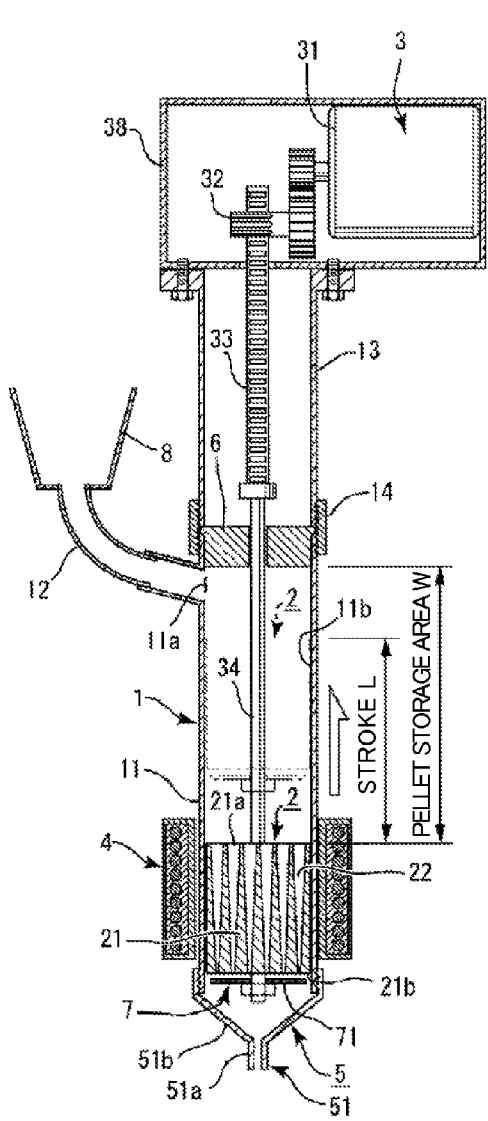
FIG. 1(A) is a longitudinal cross sectional view illustrating a return step of the present invention.
Figure 1B:
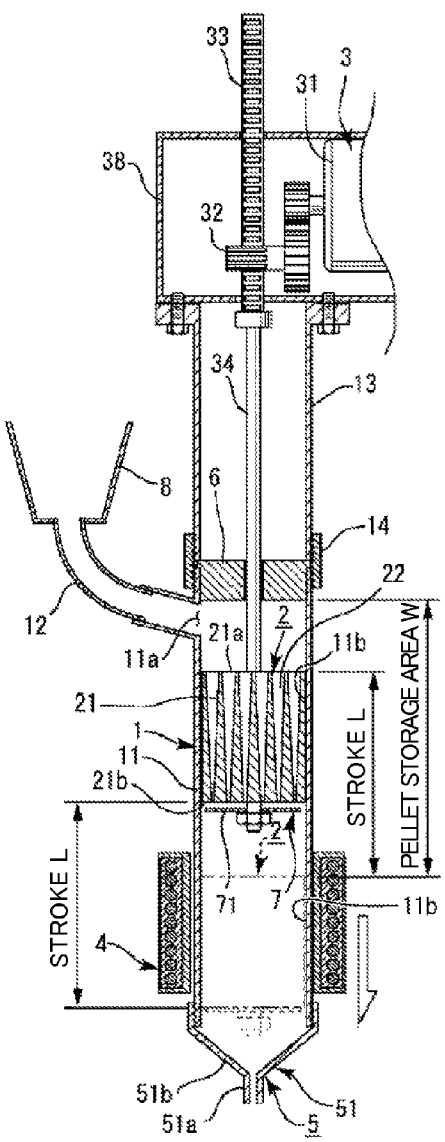
FIG. 1(B) is a longitudinal cross sectional view illustrating a outward step of the present invention.

With reference to the drawings, the present invention will be described below. As illustrated in FIGS. 1(A) and 1(B), the present invention is configured to mainly have a cylinder 1, a melting device (melter) 2 for melting pellets p, p, . . . a drive unit (driver) 3 for moving the melting device 2 in a reciprocating manner and a heating unit (heater) 4. An outlet member (outlet) 5 is provided at an end (front end) of the cylinder 1, and the melting device 2 and a stopper part 6 moving in a reciprocating manner are provided in the cylinder 1. The stopper part 6 is formed in a plate shape in the present embodiment However, the shape of the stopper part 6 is not limited to this, and the stopper part 6 may be formed in a sphere shape as far as the stopper part 6 can close the inside of the cylinder 1. A reciprocating motion bar 34 is provided at the drive unit 3.

The outlet member 5 is mounted on the one-end side (lower end in FIG. 1) in the axial direction (this direction may be called "longitudinal direction" and denotes the up-and-down direction in FIGS. 1(A) and 1(B)) of the cylinder 1, and the stopper part 6 is provided at the other end side (upper end in FIG. 1(A)) in the axial direction (upper end in the longitudinal direction). Besides, at the other end (upper end in FIGS. 1(A) and 1(B)) in the axial direction (upper end in the longitudinal direction), the drive unit 3 is mounted on the cylinder 1 via a cylindrical case 13. The drive unit 3 is used to cause the melting device 2 to move in a reciprocating manner (see FIGS. 1 and 2).

As for a material of the cylinder 1, it needs to be heated quickly and is preferably iron or stainless steel containing iron in large amounts. The cylinder 1 is configured to have a cylinder main body 11 that is formed in an elongated shape, and a tubular supply tube 12 that is connected from a pellet supply opening 11a formed near the stopper part 6. The supply tube 12 is formed to communicate with a hopper 8 where pellets p, p, . . . are stored. The supply tube 12 is connected to the hopper via a part that is formed integral with the cylinder 1 and a pipe appropriately formed in an arc shape. The cylinder main body 11 is a cylindrical member and has an approximately column-shaped space surrounded by an inner-circumferential side surface part 11b.

The thickness of the cylinder main body 11 is preferably about 2 mm. The hopper 8 is able to store a large number of pellets p, p, . . . and the charged pellets p, p, . . . are conveyed via the supply tube 12 and the pellet supply opening 11a to the cylinder main body 11 (see (A) of FIG. 2). Though it is not illustrated specifically, the pellets p, p, . . . may be press-charged to the supply tube 12 by a screw or an air pressure device. The cross section of the cylinder 1 is a circle, but may be a distorted circle or ellipse. In such a case, accurate reciprocating movement is possible without rotating the melting device 2 of the same shape.

At one end side (lower end) in the axial direction (longitudinal direction) of the cylinder main body 11, the outlet member 5 including a nozzle part 51, a die 52 or the like is provided. In the outlet member 5, as mentioned above, the nozzle part 51 and the die 52 (see FIG. 11) are provided. The nozzle part 51 is formed to be exchangeable in accordance with a die that is used together with the injection device (injector) of the present invention so as to change the nozzle size of an injection part. The nozzle part 51 is formed of an injection outlet 51a and a connecting part 51b (see FIG. 1(A)).

The injection outlet 51a is formed narrower than the inner diameter of the cylinder main body 11 and is a part that is inserted into the gate of the die (not shown). The connecting part 51b of the nozzle part 51 is formed to have a screw structure (outer screw, inner screw) thereby to be detachable from the cylinder main body 11. The material of the nozzle part 51 preferably has excellent heat conductivity and is desired to be, specifically, beryllium copper or copper.

Figure 11:
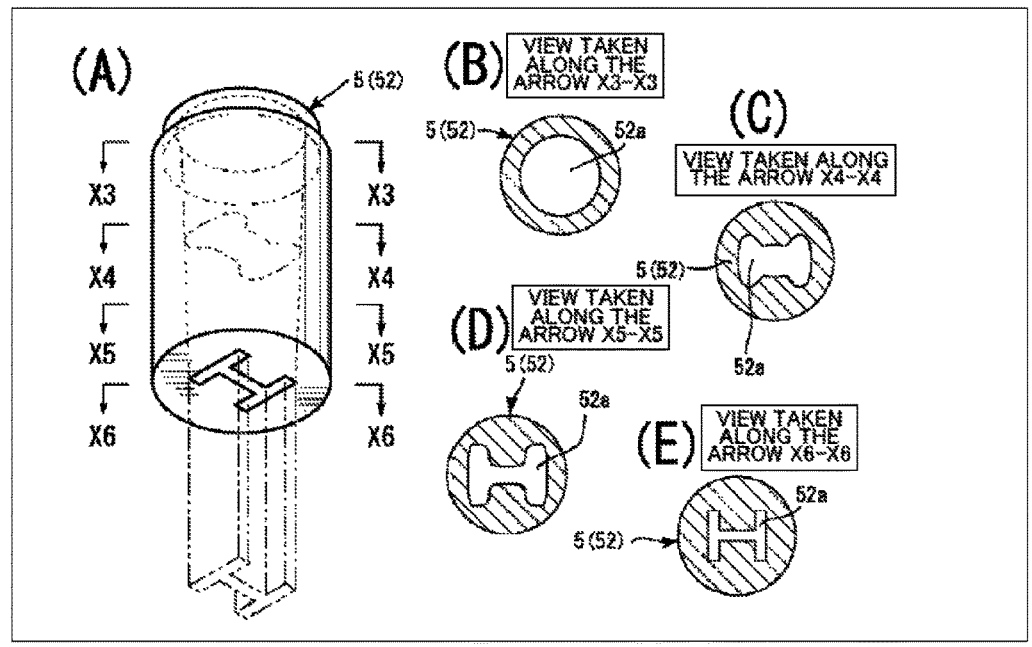
FIG. 11 shows a die for manufacturing a H-shaped sheet piece in the outlet member of the injection device of the present invention ((A) is a perspective view of the die. (B) is an enlarged cross sectional view taken along the line X3-X3 in FIG. 11(A). (C) is an enlarged cross sectional view taken along the line X4-X4 in (A). (D) is an enlarged cross sectional view taken along the line X5-X5 in (A). (E) is an enlarged cross sectional view taken along the line X6-X6 in (A).)

The die 52 is a member for manufacturing a resin sheet piece. The die 52 is mounted, after detaching the nozzle part 51, directly on the cylinder 1 to be close to the melting device 2 of the cylinder 1. As illustrated in FIG. 11, for example, a molding hole 52a in appropriate shape is formed in the die 52. The specific shape of the molding hole 52a is "H" or may be any of other shapes such as "L", rectangular shape, triangle shape, round shape and other polyangular shapes.

The molding hole 52a is formed to be a round opening at the mounting side of the die 52 to the cylinder 1 so that the melted resin q can flow easily. Then, toward the discharge opening side of the die 52, the molding hole 52a is formed to be in a desired shape. Specifically, the molding hole 52a to form an "H"-shaped resin sheet piece is formed such that the shape is changed gradually from the round shape at the mounting side to the cylinder 1 to the "H" shape at the outer side (see FIG. 11((B)-(E))). Thus, the die 52 serves to manufacture sheet piece of resin. That is, the die 52 is used to be able to manufacture sheet pieces of same cross section.

Figure 5:
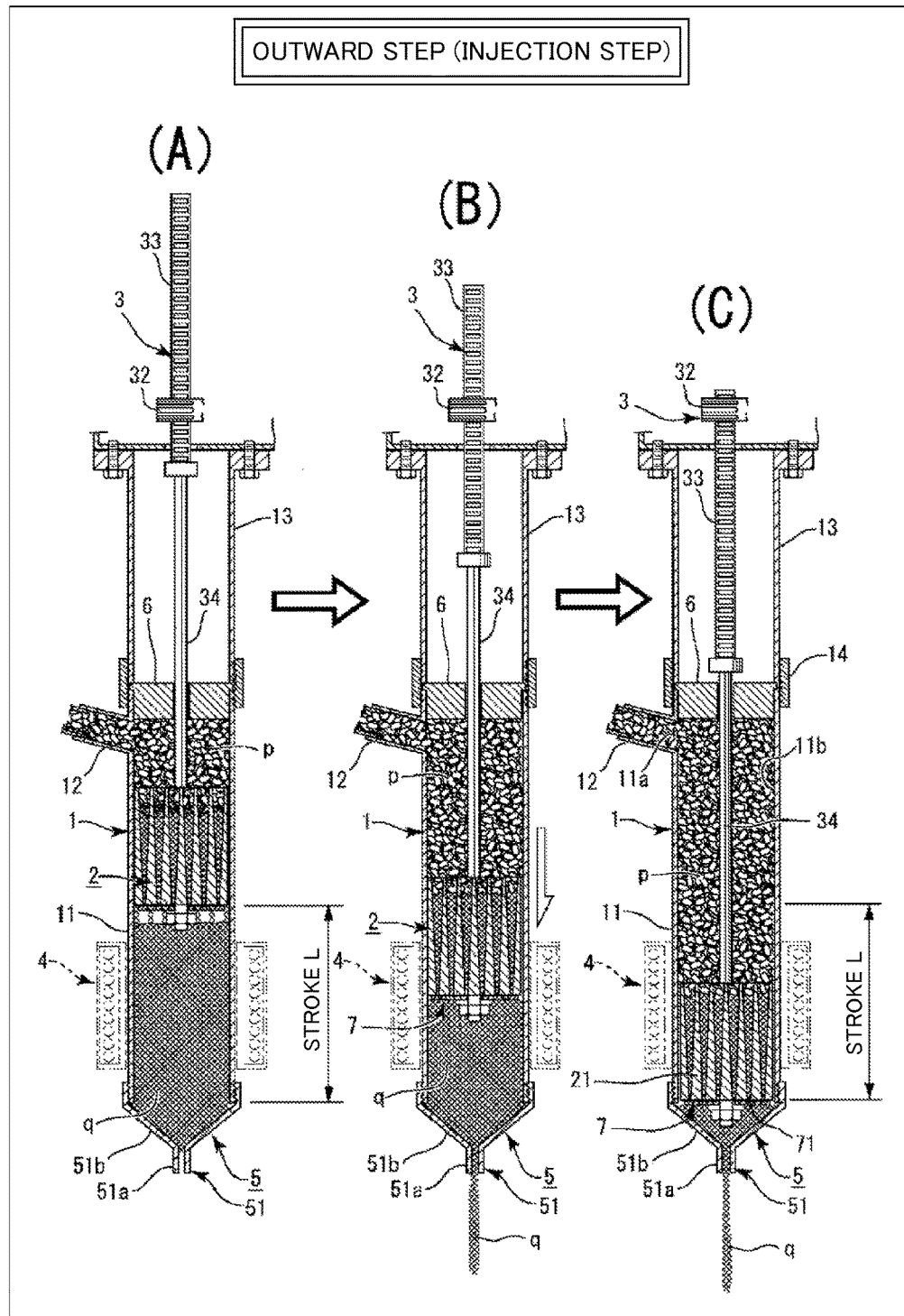
FIG. 5 shows longitudinal cross sectional views of the injection steps of the present invention ((A), (B), and (C) show the injection steps, immediately after the initial position, at the middle position, and at the end position, respectively)
Figure 6:
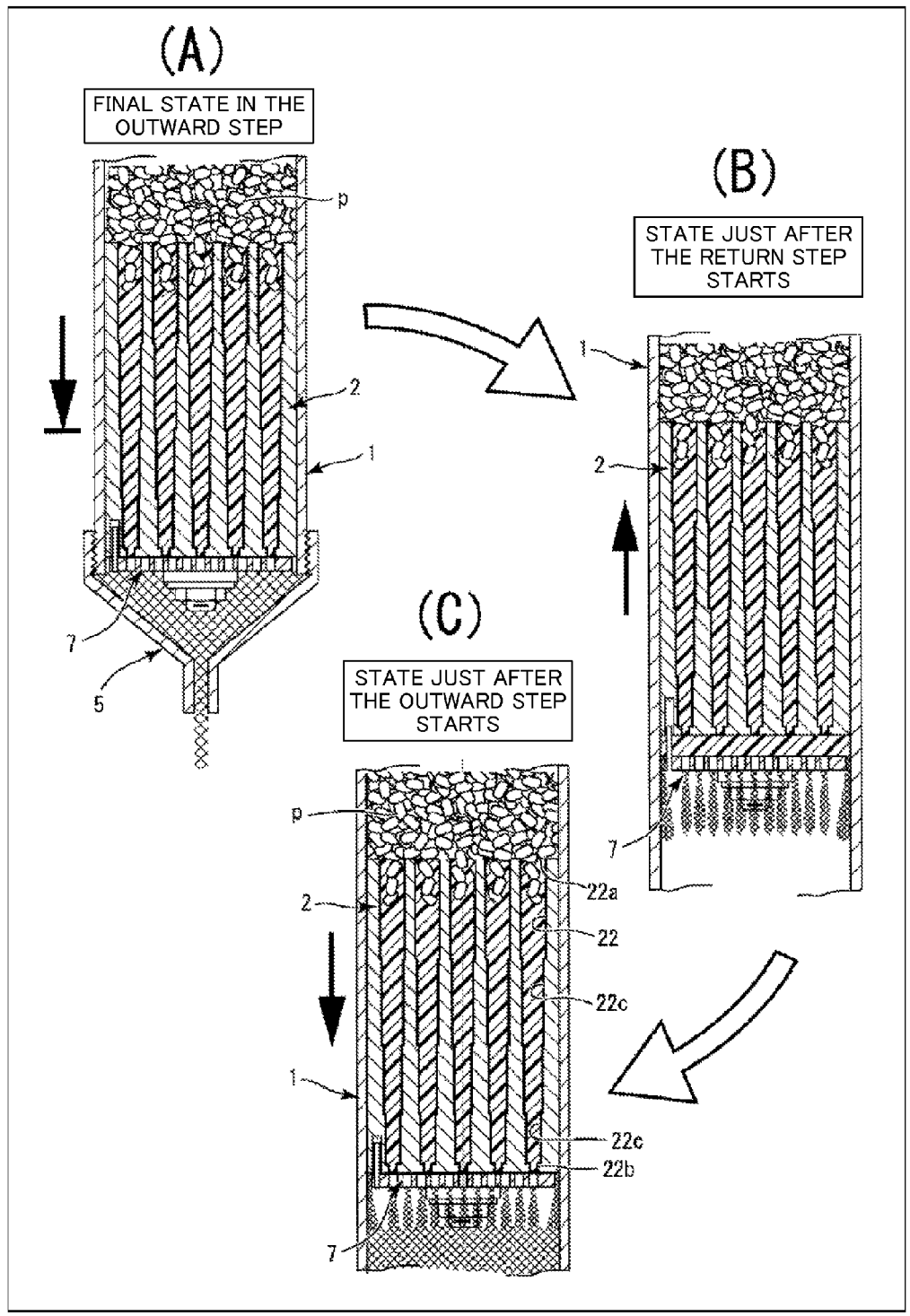
FIG. 6 shows opening and closing operations of an opening and closing valve in the melting step and injection step of the melting device in reciprocating movement according to the present invention.
Figure 7:
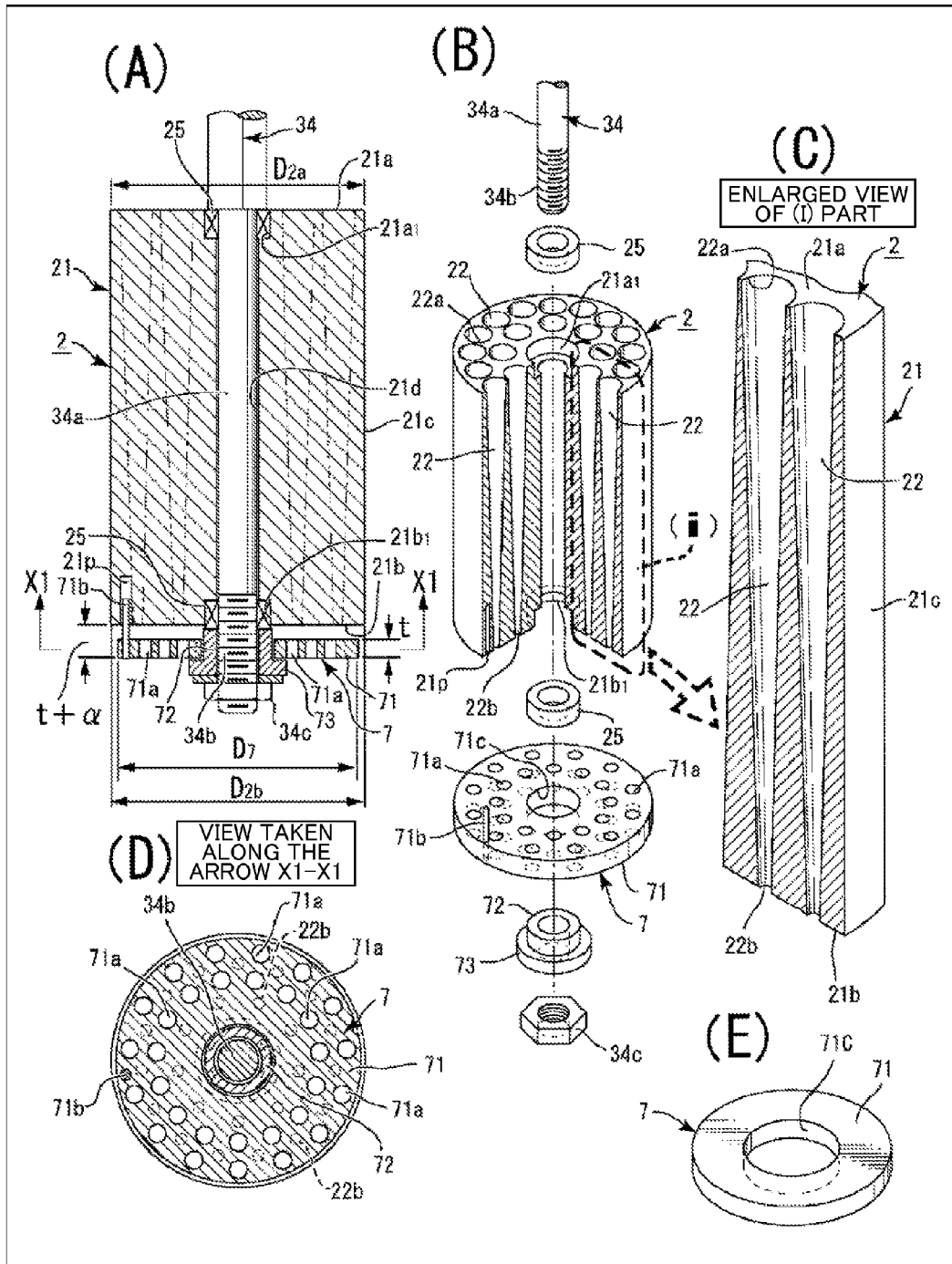
FIG. 7 show enlarged views of the melting device and the opening and closing valve part ((A) is an enlarged longitudinal cross section view of the melting device and closing valve part. (B) is an exploded perspective view of (A) including a partial sectional view. (C) is an enlarged view of the (i) part in (B). (D) is a cross sectional view taken along the line X1-X1 in (A). (E) is a perspective view of the opening and closing valve in another embodiment.)

The melting device 2 has an approximately cylindrical device main body 21 in which a large number of melting holes 22, 22 are formed (see FIGS. 1, 5 and 7). The material of the device main body 21 is preferably a material having large heat capacity and excellent heat conductivity. Specifically, it is copper or beryllium copper. The device main body 21 is formed to be able to move in an reciprocating manner inside the cylinder main body 11 of the cylinder 1 and is generally located near the outlet member 5 (see FIG. 1(A)).

The device main body 21 of the melting device 2 is formed in a cylindrical shape as described above, in which a surface at the side where it faces the stopper part 6 and a large amount of pellets p, p inflow is called inflow-side surface part 21a. A surface opposite to the inflow-side surface part 21a where it facies the outlet member 5 and melted resin q outflows is called outflow-side surface part 21b.

An outer circumferential side surface of the device main body 21 is called circumferential side surface 21c. As described above, the device main body 21 is an accurate cylindrical shape such that the diameter D2a of the inflow-side surface part 21a is equal to the diameter D2b of the outflow-side surface part 21b at any position in the axial direction of the circumferential side surface 21c (see (A) of FIG. 7). In addition, the melting device 2 as shown in FIGS. 1 to 6 is also formed in an accurate cylindrical shape as described above.

That is, the following equation is satisfied (see (A) of FIG. 7):

$$D2a=D2b$$

Next, the melting holes 22 are formed in the axial direction (longitudinal direction) of the device main body 21 (see FIGS. 1 to 6). More specifically, the melting holes 22 are tunnel-shaped or tubular through holes in a cone shape (see (B) and (C) of FIG. 7). In the melting holes 22, the above-mentioned cone-shaped through holes are formed such that the cross section orthogonal to the hole forming direction becomes narrow shape from wide shape, and specifically, each hole has a circular cone-shaped or pyramid air space (see (B) and (C) of FIG. 7, and FIGS. 8(A) and 8(B)).

In the present invention, the cone shape of each melting hole 22 is preferably a circular cone and the diameter of the melting hole 22 is formed to be gradually smaller (see (B) and (C) of FIG. 7). As described above, as the melting hole 22 is a hole having a cone-shaped air space, the openings at both ends of the melting hole 22 are different in size. Then, the large opening side of each melting hole 22 is called inflow-side large opening 22a where the pellets p, p, . . . inflow (see (A) and (B) of FIG. 4, and (B) and (C) of FIG. 7).

Figure 4:
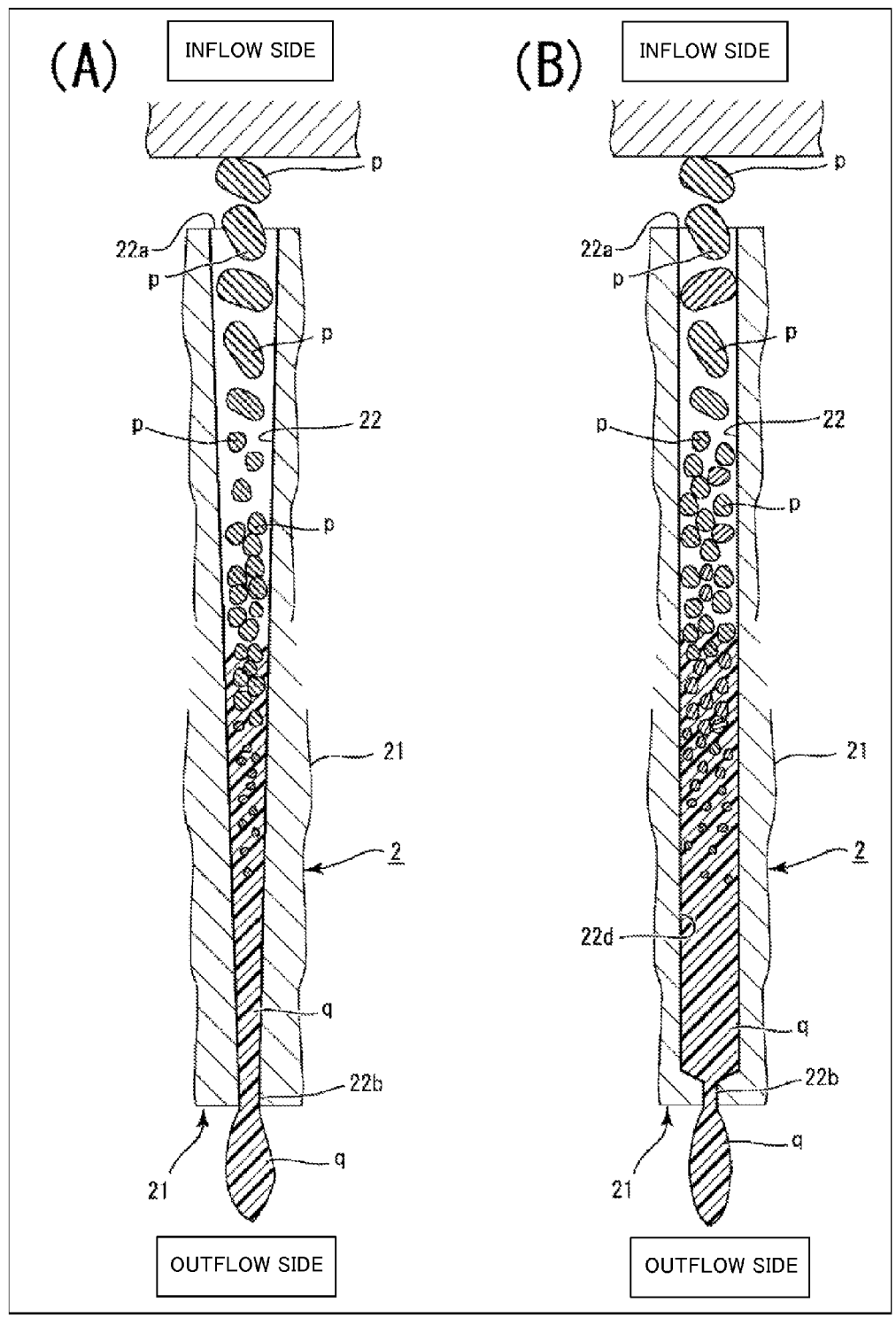
FIG. 4 shows enlarged longitudinal cross section views of melting holes in which pellets move, melting, from an inflow-side large opening to an outflow-side small opening ((A) shows an embodiment of the melting hole. (B) shows another embodiment of the melting hole with a narrowed end.)

Besides, the small opening side of each melting hole 22 is called outflow-side small opening 22b (see (A) of FIG. 4, and (B) and (C) of FIG. 7). That is, the melting hole 22 is a channel communicating from the inflow-side large opening 22a to the outflow-side small opening 22b and the cross section becomes smaller from the inflow-side large opening 22a to the outflow-side small opening 22b. Then, the inflow-side large opening 22a is located at the inflow-side surface part 21a of the device main body and faces (is opposite to) the stopper part 6 (see FIGS. 1(A) and 1(B)). In addition, the outflow-side small opening 22*b* is located at the outflow-side surface part 21*b* and faces (is opposite to) the outlet member 5 (see FIGS. 1(A) and 1(B)).

As described above, inflow-side large openings 22*a*, 22*a*, . . . of a large number of melting holes 22, 22, . . . are arranged in the inflow-side surface part 21*a* of the melting device 2. In the inflow-side surface part 21*a*, as it faces the stopper part 6 and the pellets p, p, . . . flow into the inflow-side large openings 22*a*, the inflow-side surface part 21*a* is called inflow side of the melting device 2.

In addition, outflow-side small openings 22*b*, 22*b*, . . . of a large number of melting holes 22, 22, . . . are arranged in the outflow-side surface part 21*b* of the melting device 2. In the outflow-side surface part 21*b*, as it faces the outlet member 5 and melted resin q obtained by melting the pellets p, p, . . . outflow from the outflow-side small openings 22*b*, the outflow-side surface part 21*b* is called outflow side of the melting device 2. The melting state of the melting device 2 toward the inflow side and the outflow side are illustrated in FIG. 4.

When each melting hole 22 is a cone-shaped hole, the cross sectional shape orthogonal to the axial direction (longitudinal direction) is a round shape at any position (see (B) and (C) of FIG. 7). Then, the inflow side large opening 22*a* of each melting hole has such a size that the whole of one pellet p can be inserted into the melting hole 22 or at least apart of the pellet p can be inserted into the melting hole 22. As for the specific size of the inflow-side large opening 22*a*, the diameter is such that pellets p, p, . . . can be easily inserted and is about 3 to 4 mm.

Each outflow-side small opening 22*b* has such a diameter that melted resin q obtained by melting the pellets p, p, . . . into liquid can flow, which diameter is about 1 to 1.5 mm. The melting hole 22 has a cross section along the axial direction (longitudinal direction) that is in an approximately tapered shape. That is, it is a cone shape along the axial direction (longitudinal direction), and if it is in a pyramid shape, the shape may be quadrangular pyramid or triangular pyramid. Or, a combined shape of the quadrangular pyramid and triangular pyramid may be used as well (see FIG. 8). The melting holes 22 of this type are such that the inflow-side large openings 22*a* of the cone-shaped melting holes 22 are formed in a polygonal shape more than triangular shape and the outflow-side small openings 22*b* are in a round shape.

Figure 8A:
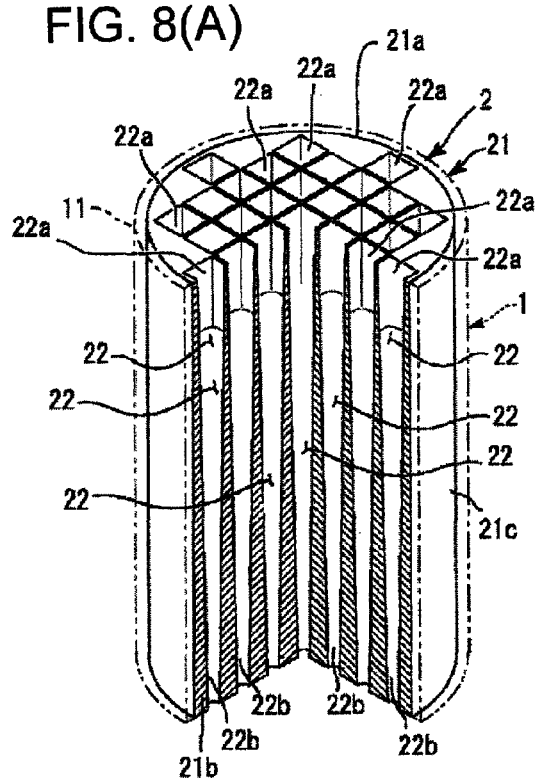
FIG. 8(A) is a perspective view of the melting device with quadrangular pyramid shaped melting holes, including a partial sectional view.
Figure 8B:
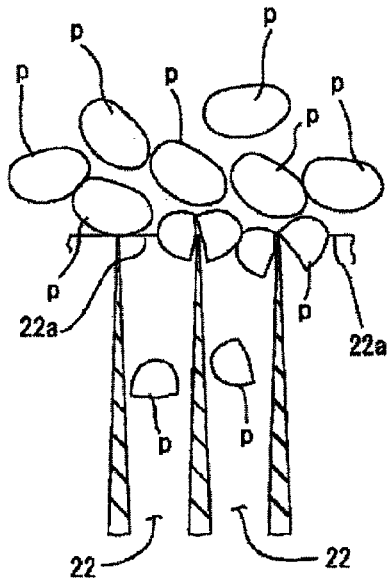
FIG. 8(B) is a view illustrating a state of edge-shaped parts at the tip end in FIG. 8(A)

More specifically, there is an embodiment in which the outflow-side large opening 22*a* of each cone-shaped melting hole 22 is in an approximately square shape and a gap between adjacent inflow-side large openings 22*a*, 22*a* is minimized (see FIGS. 8(A) and 8(B)). In this embodiment, the part at the boundary between adjacent inflow-side large openings 22*a*, 22*a*, . . . is formed like edge (see FIG. 8(A)), and the combination of inflow-side large openings 22*a*, 22*a* appears in a lattice pattern (see FIG. 8(A)). Besides, the inflow-side large openings 22*a*, 22*a* approximately in a polygonal shape may be in a triangular shape or hexagonal shape as well as the rectangular shape such as square, and are preferably such that the boundary edges of the adjacent inflow-side large openings 22*a*, 22*a* are parallel and straight.

Thus, the inflow-side large openings 22*a*, 22*a*, . . . are each formed in an approximately square shape and the large number of inflow-side large openings 22*a*, 22*a* form a lattice patter (see FIG. 8(A)). Further, as the boundary edges of adjacent inflow-side large openings 22*a*, 22*a* are formed in an edge shape (cutter) as illustrated in (B) of FIG. 8, the circumferential edge of each inflow-side large opening 22*a* is formed in a keen-edged shape and when the pellets p, p, . . . that are going to flow into the inflow-side large openings 22*a*, 22*a* are caught by the edge-shaped parts, the pellets p, p are broken into small pieces by pressure of a group of the pellets p, p, . . . pressed by the stopper part 6 so that the pellets p, p are easily inserted into the inflow-side large openings 22*a*, 22*a*.

Figure 9A:
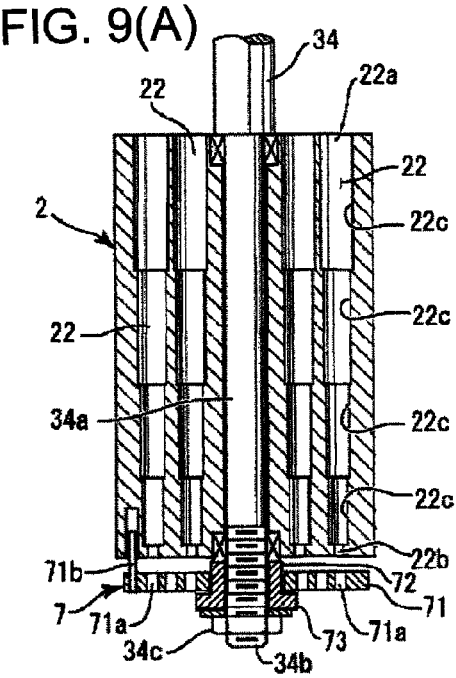
FIG. 9(A) is an enlarged longitudinal cross section view of a melting device and an opening and closing valve according to a second embodiment.

FIGS. 9 (A) and 9(B) illustrate other embodiments of the melting holes 22 of the melting device 2 that are each formed narrower at an end. FIG. 9(A) illustrates the second embodiment of melting holes 22 of the melting device 2, in which each inflow-side large opening 22*a* is formed of a plurality of cylindrical parts 22*c*, 22*c* and its diameter becomes smaller and smaller from the inflow-side large opening 22*a* to the outflow-side small opening 22*b*. An end of a cylindrical part 22*c* corresponds to the outflow-side small opening 22*b* or an end is only formed as the outflow-side small opening 22*b* (see FIG. 9(A)).

Figure 9B:
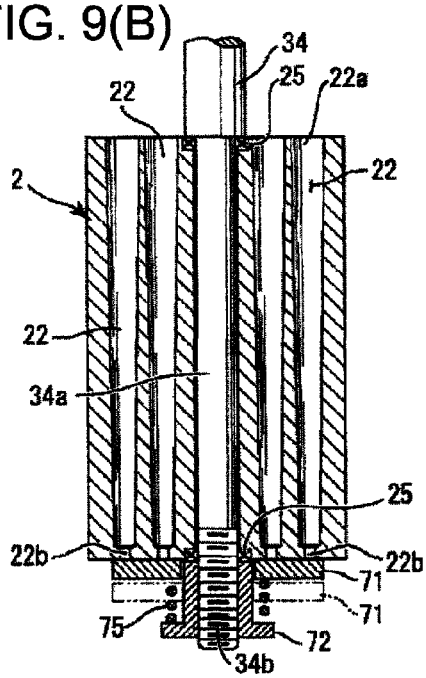
FIG. 9(B) is an enlarged longitudinal cross section view of a melting device and an opening and closing valve according to a third embodiment.

FIG. 9(B) also illustrates melting holes 22 that are each formed narrower at an end. This is the third embodiment of the melting holes 22 of the melting device 2 and each melting hole is a cone-shaped hole such that the diameter is gradually changed from a large size at the inflow-side large opening 22*a* to a middle size at the outflow-side small opening 22*b* and only an end is formed as the outflow-side small opening 22*b*.

Figure 10:
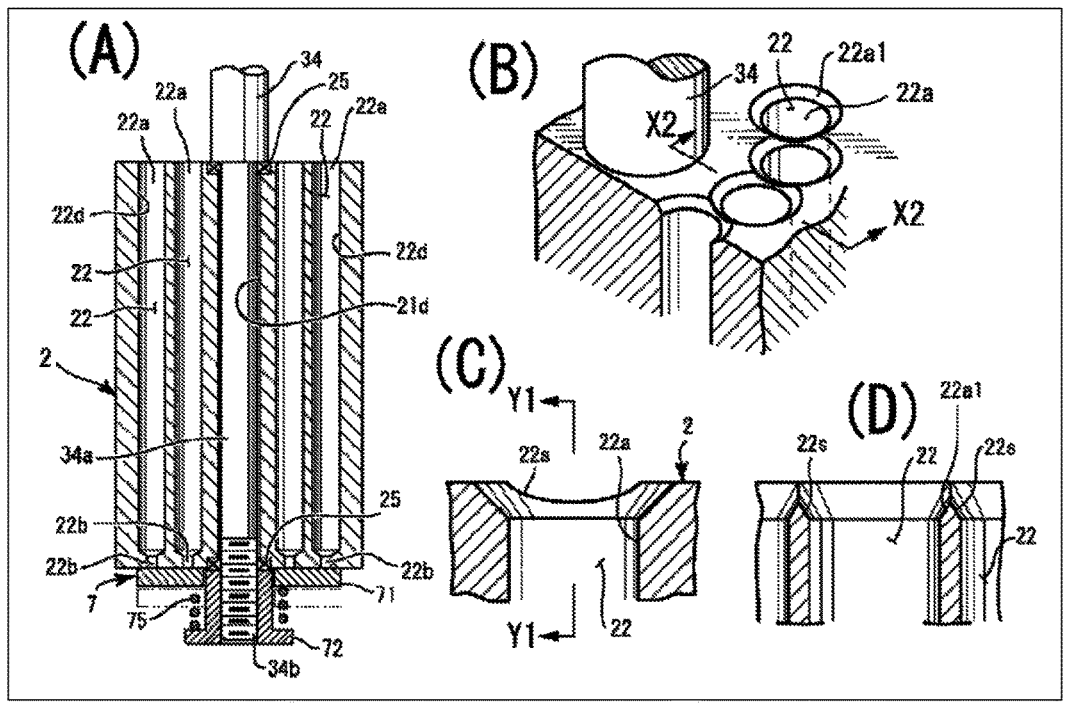
FIG. 10 shows a melting device and an opening and closing valve according to a fourth embodiment ((A) is an enlarged longitudinal cross section view of a the melting device and the opening and closing valve. (B) is a partial perspective view of an upper part of the melting device in a modified example of (A). (C) is an enlarged cross sectional view taken along the line X2-X2 in (B). (D) is an enlarged cross sectional view taken along the line Y1-Y1 in (C).)

(A) of FIG. 10 also illustrates melting holes 22 that are each formed narrower at an end. This is the third embodiment of the melting holes 22 of the melting device 2 and each melting hole is formed such that a large-diameter cylindrical part 22*d* as the inflow-side large opening 22*a* is formed close to an end and the end is only formed as the outflow-side small opening 22*b*.

In (B) of FIG. 10, the inflow-side large opening 22*a* of each melting hole 22 has a round cross section and the inlet part of the inflow-side large opening 22*a* may be chamfered to be a plate-shaped chamfered part 22*a*1 and the boundary parts of plate-shaped chamfered parts 22*a*1, 22*a*1 of adjacent inflow-side large openings 22*a*, 22*a* may be formed like edge (cutters) 22*s*. Due to these edge 22*s*, the pellets p, p are likely to be broken into small pieces and separated from each other by the edge 22*s* so that the pellets p, p are easily inserted into the inflow-side large openings 22*a*, 22*a* thereby to accelerate melting of the pellets p, p.

The drive unit 3 is formed of a motor drive part 31 equipped with a reducer, pinion gear 32 and a rack shaft 33. Or, though it is not shown, it may be a drive unit 3 for moving a rod in a reciprocating manner by driving of a motor drive part 31 equipped with a reducer and a ball screw and ball screw nut driving. An end of the rack shaft 33 or the rod end is connected to a reciprocating motion bar (reciprocally-movable rod) 34.

The reciprocating motion bar 34 passes through the stopper part 6 approximately in the center and is connected at the end to the melting device 2. The rack shaft 33 is covered with the cylindrical case 13 that is connected to the rear side of the cylinder 1 via a screw ring 14 and the rack shaft 33 is connected to a motor case 38 of the motor drive part 31. The reciprocating motion bar 34 is made of iron, stainless steel or the like.

The motor drive part 31 is formed of a brushless motor, stepping motor or the like and is able to perform drive control with high accuracy and to control the time of the melting step and the time of the injection step of melted resin q separately in consideration of the material of pellets. Consequently, it is possible to assure sufficient time for resin melting and complete the injection step of its melted resin q efficiently and extremely rapidly and for a short time.

For example, by setting the time of the melting step to about 30 to 60 seconds and the time of the injection step of melted resin to about 1 second, there is produced an advantageous effect of being able to complete the injection step efficiently and extremely quickly and for a short time. Particularly, use of the brushless motor is preferable as different times of melting and injection are able to be controlled appropriately and accurately. For example, it may be configured that the time of the melting step is set to be longer and the time of the injection step is set to be shorter.

The heating unit 4 is a member for heating the melting device 2 from the outer surface of the cylinder main body 11. The heating unit 4 is formed into a tubular shape to exhibit excellent heat conductivity to the melting device 2. Specifically, the heating unit 4 may be an IH heater in a wound shape to exhibit a sufficient amount of heat.

The heating unit 4 serves to heat the melting device 2 that moves in a reciprocating manner inside the cylinder main body 11 inside the cylinder 1. Specifically, the heating unit 4 is preferably an electromagnetic induction, that is, IH (induction heating) coil, and the heating unit 4 is formed by winding IH coil around a resin or ceramic heat insulating coil bobbin.

The shape of the bobbin is configured such that the distance between the IH coil and the outer side surface of the cylinder main body 11 becomes optimal. Input power is preferably variable from 0 to 1 Kw by a controller. The cylinder 1 is equipped with a thermocouple so that the temperature of the cylinder 1 is able to be set to an appropriate value. As another type of the heating unit 4, a band heater may be used. The heating unit 4 is not limited to the unit described above and may be any heating unit as far as it is able to be used in the present invention.

The heating unit 4 is fixedly mounted on the cylinder main body 11 and is configured to hold the heat source sufficiently in terms of the heat amount of the melting device 2 even if it moves in a reciprocating manner by drive unit 3. This is because, the heating unit 4 is generally set at the position shown in FIG. 1(A), that is, at the fixed position close to the outlet member 5. In the pellet storage area W, if the melting device 2 moves backward (return travel) (melting step), it quickly moves from that state to the outward travel (injection step) so that the melting device 2 is not easily cooled from the heating state and a sufficient amount of heat is able to be achieved to keep a predetermined temperature.

Further, the melting device 2 is provided with a heat insulation process according to need, which is described specifically below. The reciprocating motion bar 34 of the drive unit 3 is inserted movably in a center through hole 21d that passes through the centers of the outflow-side surface part 21b and the inflow-side surface part 21a of the melting device 2. That is, the inner diameter of the center through hole 21d is formed to be slightly larger than the diameter of the reciprocating motion bar 34 and not in contact with the reciprocating motion bar 34. Further, at the center positions of the outflow-side surface part 21b and the inflow-side surface part 21a of the melting device 2, recesses parts 21a1 and 21b1 are formed.

In the recesses parts 21a1 and 21b1, there are arranged circular plate shaped support pieces 25, 25 made of a ceramics or polyimide heat insulating material. The support pieces 25, 25 are fixed to the reciprocating motion bar 34. Specifically, first, one support pieces 25 is inserted onto the reciprocating motion bar 34, and then, the tip end side of the reciprocating motion bar 34 passes through the center through hole 21d of the melting device 2. Then, the one support piece 25 is arranged in the recess part 21a1 of the inflow-side surface part 21a of the melting device 2.

In this state, the other support piece 25 and a circular plate 71 are fit onto a collar member 72, which is then fit on a tip-end side small-diameter part 34a of the reciprocating motion bar 34. The collar member 72 is made from iron, stainless steel or the like. Besides, a nut 34c is fit on a screw part 34b of the tip-end side small-diameter part 34a of the reciprocating motion bar 34 thereby to fix the melting member 2 to the reciprocating motion bar 34. That is, the melting device 2 is fixed to the reciprocating motion bar 34 via the support pieces 25, 25 out of direct contact with the reciprocating motion bar 34. Therefore, the reciprocating motion bar 34 is able to be in such a heat insulation state that it receives almost no heat from the melting device 2.

With this configuration, the heat source generated in the melting device is configured not to be transferred to the reciprocating motion bar 34 made of metal (mainly, stainless steel) inside the cylinder 1. Thus, heat insulation of the melting device 2 is achieved for the purpose of using heat of the melting device 2 only for melting of the pellets p, p in melting. Accordingly, the heat insulating member (support pieces 25 or cylindrical collar 35) is provided between the melting device 2 and the reciprocating motion bar 34.

In particular, when the diameter of each outflow-side small opening 22b of the melting device 2 is much smaller than the diameter of the inflow-side large opening 22a (see FIG. 6), for example, it is about 1 mm, if the melted resin q is pressed via the outlet member 5 by the outward travel of the drive unit 3, the surface area of the outflow-side surface part 21b of the melting device 2 is much larger than the total area of the outflow-side small openings 22b, the rate of the melted resin q flowing backward from the outflow-side small openings 22b becomes extremely small and the melted resin q can be pressed to be injected from the outlet member 5 in good condition. Thus, the injection step of the melting resin q may be performed with no opening and closing valve 7 provided in the melting device, As the internal configuration of the melting device 2, an opening and closing valve (opening-and-closing valve) 7 is provided where necessary (see FIGS. 1, 2 and 5). That is, the opening and closing valve 7 is provided to open the inflow-side large openings 22a or outflow-side small openings 22b of the melting device 2 in the return step and close the inflow-side large openings 22a or outflow-side small openings 22b of the melting device 2 in the outward step.

Specifically, the opening and closing valve 7 is configured to close the tip end of the melting device in the outward step, or release (open) it in the return travel. More specifically, the opening and closing valve 7 is formed of a circular plate 71 and the collar member 72 with a collar 73. The collar member 72 with collar 73 is located in front of the outflow side surface part 21b of the melting device 2 and the opening and closing valve 7 is provided at the tip end of the reciprocating motion bar 34 to be slightly movable between the collar 73 and the outflow-side surface part 21b, via the collar member 72.

The diameter D7 of the circular plate 71 is formed to be smaller than the diameter D2b of the outflow-side surface part 21b (see (A) of FIG. 7). That is, the following expression is satisfied:

$$D7 < D2b (= D2a)$$

This is because in the return step, the melted resin q is able to flow more easily than on the outer circumferential part of the opening and closing valve 7.

The above-mentioned structure is explained simply below. The opening and closing valve 7 is provided between the outlet member 5 and the melting device 2 and the opening and closing valve 7 is configured to have a circular plate 71 moving close to or away from the outflow-side small opening 22*b* of the melting device 2. The circular plate 71 is formed to have a smaller diameter than the diameter of the melting device 2.

In the circular plate 71 in the opening and closing valve 7, a plurality of through holes 71*a* is formed as illustrated in (B) and (D) of FIG. 7, and the through holes 71*a* are formed not to match the positions of the outflow-side small openings 22*b* of the melting device 2 and a guide pin 71*b* provided jutting from the circular plate 71 is provided to be freely inserted in a hole part 21*p* formed in the melting device 2.

In another embodiment of the opening and closing valve 7, as illustrated in (E) of FIG. 7, the plural through holes 71*a* are eliminated from the circular plate 71. That is, the circular plate 71 is a plate with no hole and the diameter of the circular plate 71 is smaller than the diameter of the melting device 2. In this embodiment, in the return travel, the melted resin q all flows on the outer circumferential part of the opening and closing valve 7.

In the injection step, when the melting device 2 equipped with the opening and closing valve 7 charges melted resin q into the die, particularly, the melted resin q inside the outlet member 5 becomes under high pressure and may flow backward. Therefore, the opening and closing valve 7 is configured to be always under elastic pressure by an elastic member 75 as compression spring.

In another embodiment of the circular plate 71 of the opening and closing valve 7, though it is not shown, the circular plate 71 may be configured such that it is configured to have the same diameter as the diameter D2*b* of the outflow-side surface part 21*b* of the melting device 2 and notches are formed at plural points (for example, four points) on the circumferential edge of the circular plate 71. Each notch is formed in a U shape or horizontal U shape.

In the collar member 72 illustrated in (A) of FIG. 10, an inner screw is formed at the inside that fits to the screw part 34*b* of the tip-end side small-diameter part 34*a*. With this structure, the collar member 72 is fit on the tip-end side small-diameter part 34*a* so that the reciprocating motion bar 34 is fixed to the melting device 2 without the nut 34*c* being fit on the screw part 34*b*, as illustrated in (A) of FIG. 7.

With the thus-configured collar member 72 and opening and closing valve 7, the circular plate 71 is configured to be able to move close and away between the collar 73 of the collar part 72 and the melting device 2. Specifically, assuming the thickness of the circular plate 71 is t, the distance between the collar and the surface of the melting device becomes thickness t+a, and the above-mentioned movement of the circular plate 71 is enabled within the range of a (see (A) of FIG. 7). This movement is also enabled when the elastic member 75 is provided as a compression spring.

Next description is made about the pellet melting step and theory. First, before the melting step, as illustrated in (A) of FIG. 2 and (A) of FIG. 3, in the pellet storage area W in the cylinder 1, pellets p, p, . . . are charged from the pellet supply opening 11*a* and are stored in front of the inflow-side surface part 21*a* of the melting device 2. The pellet storage area W is provided in the cylinder 1 between the rear part of the melting device 2 when the injection step is finished and the stopper part 6. The pellet supply opening 11*a* is provided at the rear position in the pellet storage area W.

Figure 2:
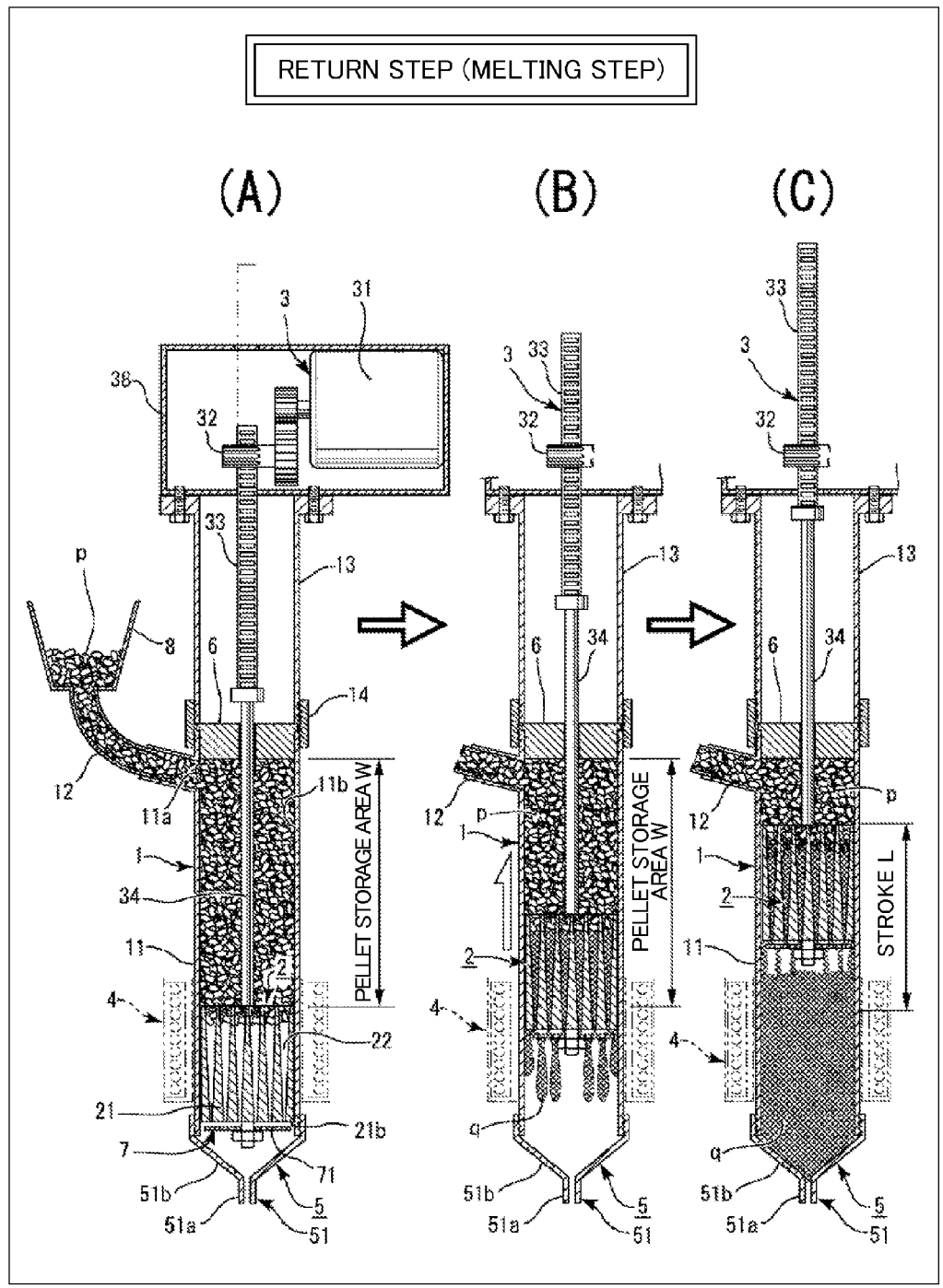
FIG. 2 show longitudinal cross sectional views of the melting step of the present invention ((A), (B), (C) show the melting step in the initial position, the middle position, and the end position, respectively.)
Figure 3:
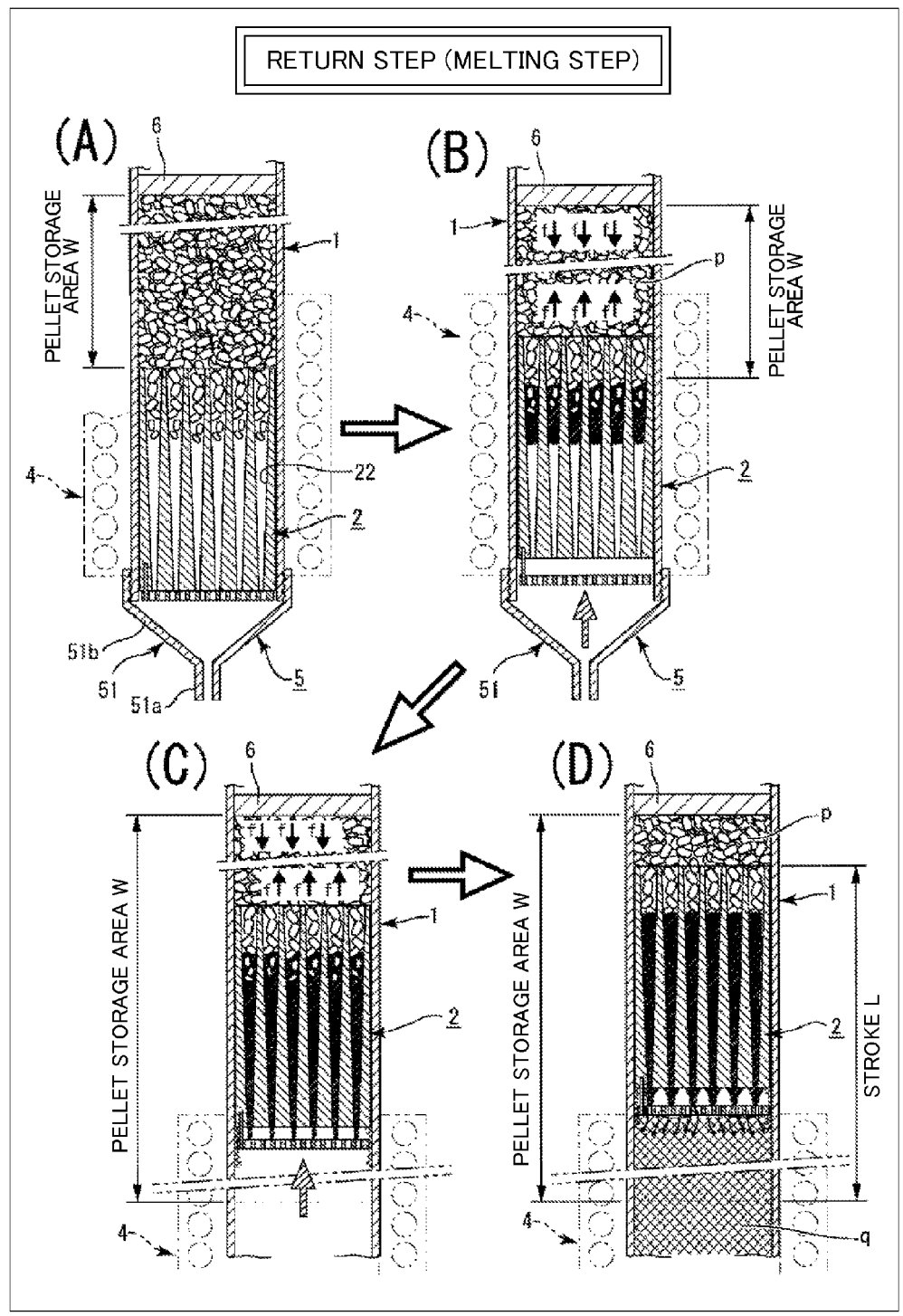
FIG. 3 shows enlarged longitudinal cross section views of a main part of the melting steps of the present invention ((A), (B), (C), and (D) show the melting step of in the initial position, the two middle positions, and the end position, respectively.)

Then, when the melting step is set ON, the return step starts by the drive unit 3 and many pellets p, p in the pellet storage area W are compressed between the inflow-side surface part 21*a* of the melting device 2 and the stopper part 6, as illustrated in (B) of FIG. 2 and (B) of FIG. 3. The pellets p, p, . . . also move to return to the hopper 8 side, but, actually, there occurs pressure f, f, . . . between the pellets p, p and the pellets p, p are brought into a pressed state, and the pellets p, p flow from many inflow-side large opening 22*a*, 22*a*, . . . into melting holes 22, 22, . . . (see (B) of FIG. 2, (B) of FIG. 3, and (A) of FIG. 4). As described above, each inflow-side large opening 22*a* is formed in such a size that at least a part of each pellet p can be (partially) inserted into the inflow-side large opening 22*a*.

In general, the size of each inflow-side large opening 22*a* is such that a pellet p of average size is wholly inserted into the inflow-side large opening 22*a* (see (A) of FIG. 4). The pellets p, p, . . . first inserted into the melting holes 22, 22, . . . are pressed by following pellets p, p, . . . toward the outflow-side small openings 22*b* and the melting device 2 is kept at the temperature to melt the pellets by the heating unit 4.

Accordingly, the pellets p inserted from the inflow-side large openings 22*a* move from the inflow-side large openings 22*a* toward the outflow-side small openings 22*b*, while each pellet p is melted toward its center (see (A) of FIG. 4). Each pellet p is arranged such that when the pellet p is in an initial state where the pellet p begins to enter the inflow-side large opening 22*a*, the pellet p is surrounded approximately evenly by the inner circumferential wall surface of the melting hole 22.

Then, as the pellet p moves in the melting hole 22 toward the outflow-side small opening 22*b*, the pellet p is melted and its size is decreased gradually (see (A) of FIG. 4). Although the pellet p moves toward the outflow-side small opening 22*b* while it is melting, the pellet p downsized by melting is kept evenly surrounded by the inner circumferential wall surface of the melting hole 22, as the melting hole 22 is also downsized gradually. Therefore, melting of the pellets p is performed speedily.

In other words, each pellet p is surrounded approximately evenly by the inner circumferential wall part of the melting hole 22 and is always kept close to or in contact with the inner circumferential surface part (see (A) of FIG. 4). Then, as melting of the pellet p proceeds, the pellet p moves into a narrow part of the melting hole 22 so that melting of the pellet p is accelerated. As the pellet p is melt into liquid inside the melting hole 22, a following pellet p is promoted to melt by heat of already liquefied pellet pa (see FIG. (A) of 4).

Further, as illustrated in FIGS. 9(A) and 9(B), if the melting holes 22 are each formed to be narrower at the tip end by the cylindrical parts 22*c*, 22*c* and so on, at the outlet side of each melting hole 22, the pellet is pressed and melted by a heating force so that the same operation as the cone-shaped melting hole 22 can be exhibited. Such formation of stepped holes is able to be performed inexpensively as compared with formation of cone-shaped holes.

Further, as illustrated in (A) of FIG. 10, if each melting hole 22 is formed such that the large-diameter cylindrical part 22*d* is formed as the inflow-side large opening 22*a* up to a point close to an end and the outflow-side small opening (constant narrowed end) 22*b* is formed only at the outflow side, the pellets are pressed at the backside and is melted by a heating force so that the same operation as the cone-shaped melting holes can be exhibited (see (B) of FIG. 4). Such hole formation is also able to be performed inexpensively.

Thus, as the pellets p moves from the inflow-side large openings 22*a* of the melting holes 22 toward the outflow-side small openings 22b, melting of the pellets is advanced, melting is completed near the outflow-side small openings 22b or just before the outflow-side small openings 22b, and the pellets are liquefied (see (C) of FIG. 3, and FIG. 4). The pellets p becomes completely liquefied melted resin q and are stored from the outflow-side small openings 22b in the cylinder 1, as illustrated in (C) of FIG. 2.

As described above, in the return step started by the drive unit 3, there occurs pressure f, f, . . . between the pellets p, p, . . . in the pellet storage area W, the pellets p, p, . . . are compressed, and each pellet p inserted from the inflow-side large opening 22a of the melting hole 22 is always surrounded by the inner circumferential wall surface of the melting hole 22 while it is moving toward the outflow-side small opening 22b. Therefore, the pellets p are melted by the heating unit 4, and as illustrated in (C) of FIG. 2, pressure is finished in stroke L and the melted resin q is stored in the cylinder 1 under the melting device 2.

As the plural pellets p, p, . . . are able to be melted only in almost required amount, the materials are prevented from being exposed to long-time, heat and mechanical stress in the cylinder main body 11. Accordingly, it is possible to produce resin products of high quality. In addition, the injection device of the present invention is high in melting efficiency and there is no need to charge the materials excessively, thereby achieving downsizing of the device and power saving and resource saving. Further, as the temperature becomes an injection optimum temperature and highest temperature at the melting final step just before the injection, it is possible to minimize the time duration of resin at high temperatures and thereby to produce resin molding of good quality.

Figure 12:
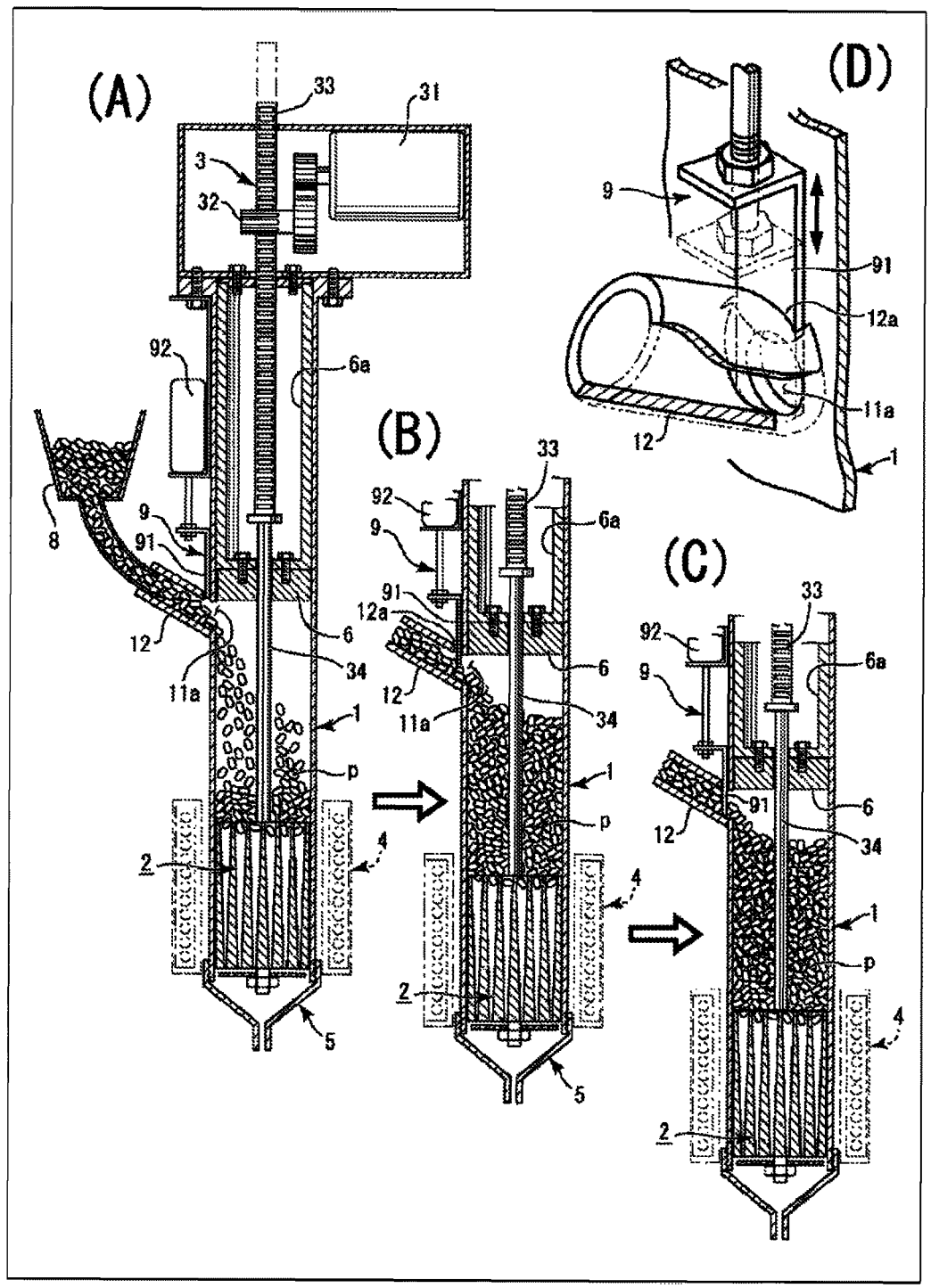
FIG. 12 shows a shutter mechanism in one embodiment of the present invention. (A) is a longitudinal cross sectional view in which a shutter mechanism is provided at the pellet supply opening and pellets are supplied. (B) is a cross sectional view illustrating the instant at which a shutter plate of the shutter mechanism begins to operate in (A). (C) is a cross sectional view illustrating the shutter plate of the shutter mechanism has finished its operation in (B). (D) is a perspective view including a partial sectional view)

In the above description, the plural pellets p are supplied continuously from the pellet supply opening 11a, however, a predetermined amount of pellets p may be supplied, as illustrated in FIG. 12. Specifically, there is provided a shutter mechanism (shutter) 9, which is configured to have a shutter plate 91 and a drive source 92 such as solenoid for moving the shutter plate 91 up and down.

A lower end part of the shutter plate 91 is inserted into a groove part 12a formed at the bottom of the supply tube 12 to block the pellet supply opening 11a so that flow of the plural pellets p flowing into the supply tube 12 can be shut down. When using such a shutter mechanism 9, the flow rate and the flowing time of the pellets p are considered to control the time to open or close the shutter plate 91. With this structure, it is possible to control the amount of pellets p to be supplied from the hopper 8 appropriately.

As described above, as the pellets are melted in desired melting amounts and injected, there is an advantageous effect of being able to process them in a well-ordered manner. The stopper part 6 of the configuration illustrated in FIG. 12 conforms in size to the inner diameter of the cylinder 1 and forms a hard synthetic resin part of thick Teflon (registered trademark) or the like fixed to the bottom end of the inside fixation cylinder 6a made of metal. With this structure, it is possible to improve the assembly process and formation easiness. Further, the cylinder 1 may be formed integral up to the position of the case 38 of the motor drive par 31.

The melting device 2 and the reciprocating motion bar 34 of the drive unit 3 of the presser invention may be provided in a plurality of sets. That is, in the present invention, generally, one melting device 2 and one reciprocating motion bar 34 of the drive unit 3 are paired in one set, and the one set of meting device 2 and reciprocating motion bar 34 is mounted in the cylinder 1 (see FIG. 1(A)). On the other hand, a plurality of sets of meting device 2 and reciprocating motion bar 34 may be mounted in one cylinder 1 in another embodiment (see FIGS. 13 and 14). These plural sets are arranged in parallel in the cylinder 1 (see (A) of FIG. 13 and (A) of FIG. 14).

Figure 13:
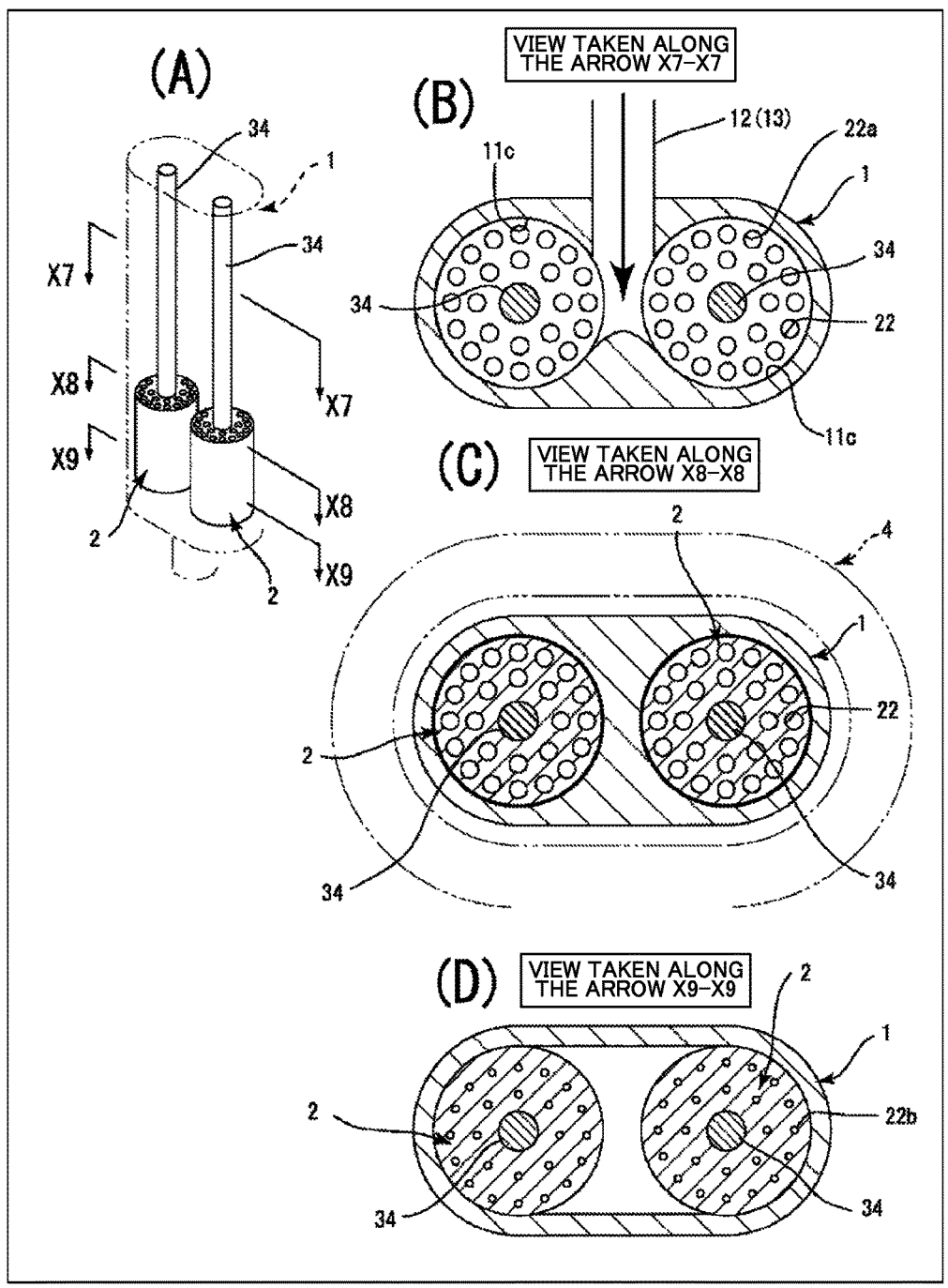
FIG. 13 shows the injection device of the present invention in which two sets of melting device and reciprocating motion bar are arranged in parallel ((A) is an approximately perspective view of the injection device. (B) is an enlarged cross sectional view taken along the line X7-X7 in (A). (C) is an enlarged cross sectional view taken along the line X8-X8 in (A). (D) is an enlarged cross sectional view taken along the line X9-X9 in (A).)

First description is made about an embodiment in which two sets of meting device 2 and reciprocating motion bar 34 are provided in the cylinder 1 (see FIG. 13). According to this embodiment, two airspaces 11c, 11c are formed in parallel in the cylinder 1. Then, the sets of meting device 2 and reciprocating motion bar 34 are arranged in parallel in the respective air spaces 11c, 11c (see FIG. 13((A)-(C))).

The hopper 8 is connected to both of the air spaces 11c, 11c (see (B) of FIG. 13). In the vicinity of the outlet member 5 mounted side of the cylinder 1, the outflow-side surface parts 21b, 21b of both of the melting devices 2, 2 are provided uncovered in the cylinder 1 and pellets p, p, . . . melting from the melting devices 2, 2 are mixed, and melted resin q is able to be conveyed from the outlet member 5 to the outside (see (D) of FIG. 13).

Figure 14:
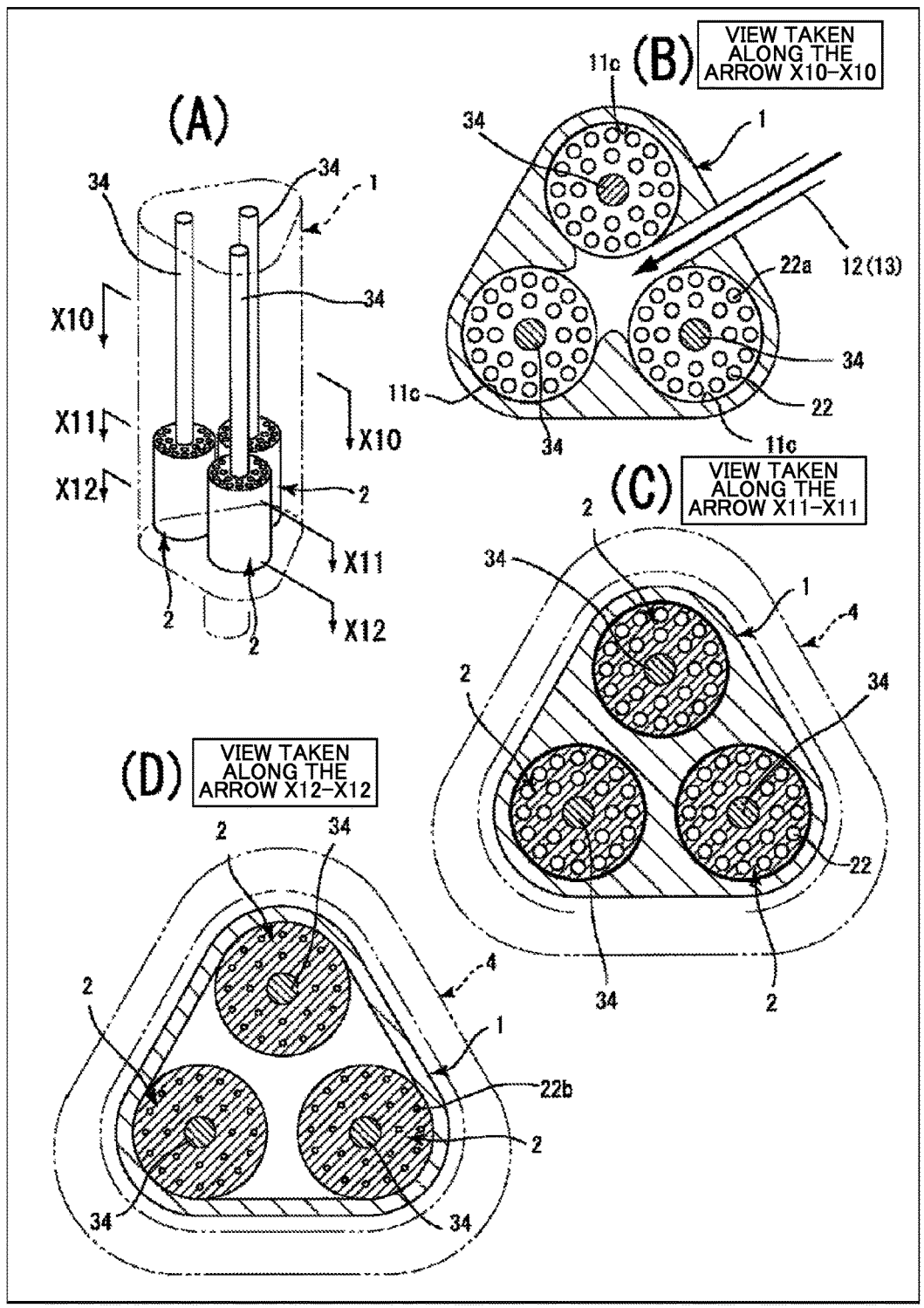
FIG. 14 shows the injection device of the present invention in which three sets of melting device and reciprocating motion bar are arranged in parallel ((A) is an approximately perspective view of the injection device. (B) is an enlarged cross sectional view taken along the line X10-X10 in (A). (C) is an enlarged cross sectional view taken along the line X11-X11 in (A). (D) is an enlarged cross sectional view taken along the line X12-X12 in (A).).

Next description is made about an embodiment in which three sets of meting device 2 and reciprocating motion bar 34 are provided in the cylinder 1 (see FIG. 14). According to the present embodiment, three air spaces 11c, 11c, . . . are formed in parallel and are arranged in a triangle. Then, the three sets of meting device 2 and reciprocating motion bar 34 are mounted in all the air spaces 11c, 11c, . . . , respectively (see FIG. 14((A)-(C))).

The hopper 8 is connected to all of the air spaces 11c, 11c, . . . (see (B) of FIG. 14). In the vicinity of the outlet member 5 mounted side of the cylinder 1, the outflow-side surface parts 21b, 21b, . . . of all of the melting devices 2, 2, . . . are provided uncovered in the cylinder 1 and pellets p, p, . . . melting from all the melting devices 2, 2, . . . are mixed, and melted resin q is able to be conveyed from the outlet member 5 to the outside (see (D) of FIG. 14).

The injection device according to the present invention is generally installed such that the axial direction (longitudinal direction) of the cylinder 1 becomes a vertical direction, but may be installed in a horizontal manner or in an inclined manner. Particularly, as for injection molding for a large-sized die, it may be installed in a horizontal manner.

REFERENCE NUMERALS

1 . . . cylinder
11a . . . pellet supply opening
2 . . . melting device
21a . . . inflow-side surface part
21b . . . outflow-side surface part
22 . . . melting hole
22a . . . inflow-side large opening
22b . . . outflow-side small opening
22s . . . edge
3 . . . drive unit
4 . . . heating unit
5 . . . outlet member
6 . . . stopper part
7 . . . opening and closing valve
9 . . . shutter mechanism
p . . . pellet
g . . . melted resin

The invention claimed is:

1. An injector comprising:
   a cylinder including an outlet at a front end of the cylinder, and a pellet supply opening provided at a position toward a rear end of the cylinder relative to the outlet;
   a melter provided in the cylinder, said melter provided with a plurality of melting holes communicating from a front end of the melter to a rear end of the melter;
   a heater configured to heat the melter; and
   a driver configured to reciprocally move the melter,
   wherein the melter, upon being heated by the heater, is configured to move from the front end toward the rear end within the cylinder to thereby melt pellets, which have been loaded into the cylinder via the pellet supply opening, and thereafter to move toward the front end to inject melted resin from the outlet.

2. The injector according to claim 1, further comprising an opening-and-closing valve between the outlet and the melter, said opening-and-closing valve configured to open the melting holes when the melter melts the pellets, and to close the melting holes when the melted resin is being injected.

3. The injector according to claim 2, wherein the opening-and-closing valve is formed as a circular plate having a diameter that is smaller than a diameter of the melter, said opening-and-closing valve configured to elastically press against the melter, and to close the melting holes when the melted resin is being injected.

4. The injector according to claim 2, wherein the opening-and-closing valve is formed as a circular plate provided with through-holes at positions that are displaced, in a direction orthogonal to a longitudinal direction of the cylinder, relative to positions of the melting holes,
   wherein said opening-and-closing valve is configured to elastically press against the melter, and to close the melting holes when the melted resin is being injected.

5. The injector according to claim 1, wherein widths of the melting holes at a front side of the melter are narrower than respective widths of the melting holes at a rear side of the melter.

6. The injector according to claim 5, wherein the widths of the melting holes gradually narrow from the rear side of the melter toward the front side of the melter.

7. The injector according to claim 5, wherein the melting holes include constant narrowed ends at a front portion of the melter, said constant narrowed ends being narrower in width than the remainder of the melting holes, respectively.

8. The injector according to claim 5, wherein the melting holes narrow in a stepwise manner from the rear side of the melter toward the front side of the melter.

9. The injector according to claim 5, wherein boundaries of openings, at the rear side of the melter, of any adjacent two of the melting holes form a cutter.

10. The injector according to claim 1, wherein a shutter is provided at the pellet supply opening; said shutter configured to open and close the pellet supply opening.

11. The injector according to claim 1, wherein the driver is configured to reciprocally move the melter via a reciprocally-movable rod, and
    wherein said injector comprises a plurality of the melters provided with the reciprocally-movable rods, respectively.

* * * * *